(12) United States Patent
Schwelling

(10) Patent No.: US 7,540,235 B2
(45) Date of Patent: Jun. 2, 2009

(54) DEVICE FOR PRESSING EMPTY CONTAINERS TOGETHER AND METHOD THEREFOR

(76) Inventor: Hermann Schwelling, Hartmannweg 5, 88682 Salem (DE)

( * ) Notice: Subject to any disclaimer, the term of this patent is extended or adjusted under 35 U.S.C. 154(b) by 56 days.

(21) Appl. No.: 10/554,378

(22) PCT Filed: Apr. 19, 2004

(86) PCT No.: PCT/EP2004/004120

§ 371 (c)(1),
(2), (4) Date: Dec. 16, 2005

(87) PCT Pub. No.: WO2004/096532

PCT Pub. Date: Nov. 11, 2004

(65) Prior Publication Data

US 2006/0288886 A1    Dec. 28, 2006

(30) Foreign Application Priority Data

Apr. 27, 2003 (DE) ................. 103 20 509
May 26, 2003 (DE) ................. 103 25 368
Nov. 13, 2003 (DE) ................. 103 53 188

(51) Int. Cl.
*B30B 13/00* (2006.01)
*B30B 3/04* (2006.01)

(52) U.S. Cl. ............ 100/39; 100/49; 100/98 R; 100/174; 100/902; 241/99; 241/166; 241/236

(58) Field of Classification Search ............ 100/94–97, 100/98 R, 99, 155 R, 172, 174, 176, 902, 100/39, 49; 241/99, 158, 166, 235, 236
See application file for complete search history.

(56) References Cited

U.S. PATENT DOCUMENTS

| | | | | |
|---|---|---|---|---|
| 1,766,327 A | * | 6/1930 | Bruton | 83/591 |
| 3,960,335 A | * | 6/1976 | Haberle | 241/236 |
| 4,009,838 A | * | 3/1977 | Tashman | 241/99 |
| 4,669,673 A | * | 6/1987 | Lodovico et al. | 241/99 |
| 4,691,871 A | | 9/1987 | Mochizuki | |
| 4,703,899 A | * | 11/1987 | Lodovico | 241/99 |
| 5,025,994 A | * | 6/1991 | Maitlen et al. | 241/99 |
| 5,556,039 A | * | 9/1996 | Minamimura et al. | 241/18 |
| 5,642,661 A | | 7/1997 | Tu | |

FOREIGN PATENT DOCUMENTS

DE          4338561          5/1995

(Continued)

*Primary Examiner*—Jimmy T Nguyen
(74) *Attorney, Agent, or Firm*—Collard & Roe, PC

(57) ABSTRACT

A method for pressing together empty containers, especially drinks bottles or cans made of plastic, especially PET or tinplate, comprises a housing with a fill opening and an outlet, a cutting and pressing disposed in the housing, and a device for driving and controlling the cutting and pressing unit. The cutting and pressing unit contains at least two rollers whose axes of rotation are arranged at a distance from each other. Each roller has at least two sections. Adjacent sections along the same roller have different diameters. When the rollers are mounted, the sections having the larger diameter are offset relative to each other and the peripheral surfaces thereof partially overlap with each other, forming cutting disks whose peripheral surfaces have at least one groove.

23 Claims, 9 Drawing Sheets

FOREIGN PATENT DOCUMENTS

| | | |
|---|---|---|
| DE | 100 55 201 | 5/2002 |
| JP | 05-228698 | 9/1993 |
| JP | 09313972 | 12/1997 |
| JP | 11-005217 | 1/1999 |
| JP | 11-033790 | 2/1999 |
| JP | 11033790 | 2/1999 |
| JP | 11-138536 | 5/1999 |
| JP | 11-151451 | 6/1999 |
| JP | 2000-102897 | 4/2000 |
| JP | 2000117130 | 4/2000 |
| JP | 2000-176691 | 6/2000 |
| JP | 2002-103093 | 4/2002 |

* cited by examiner

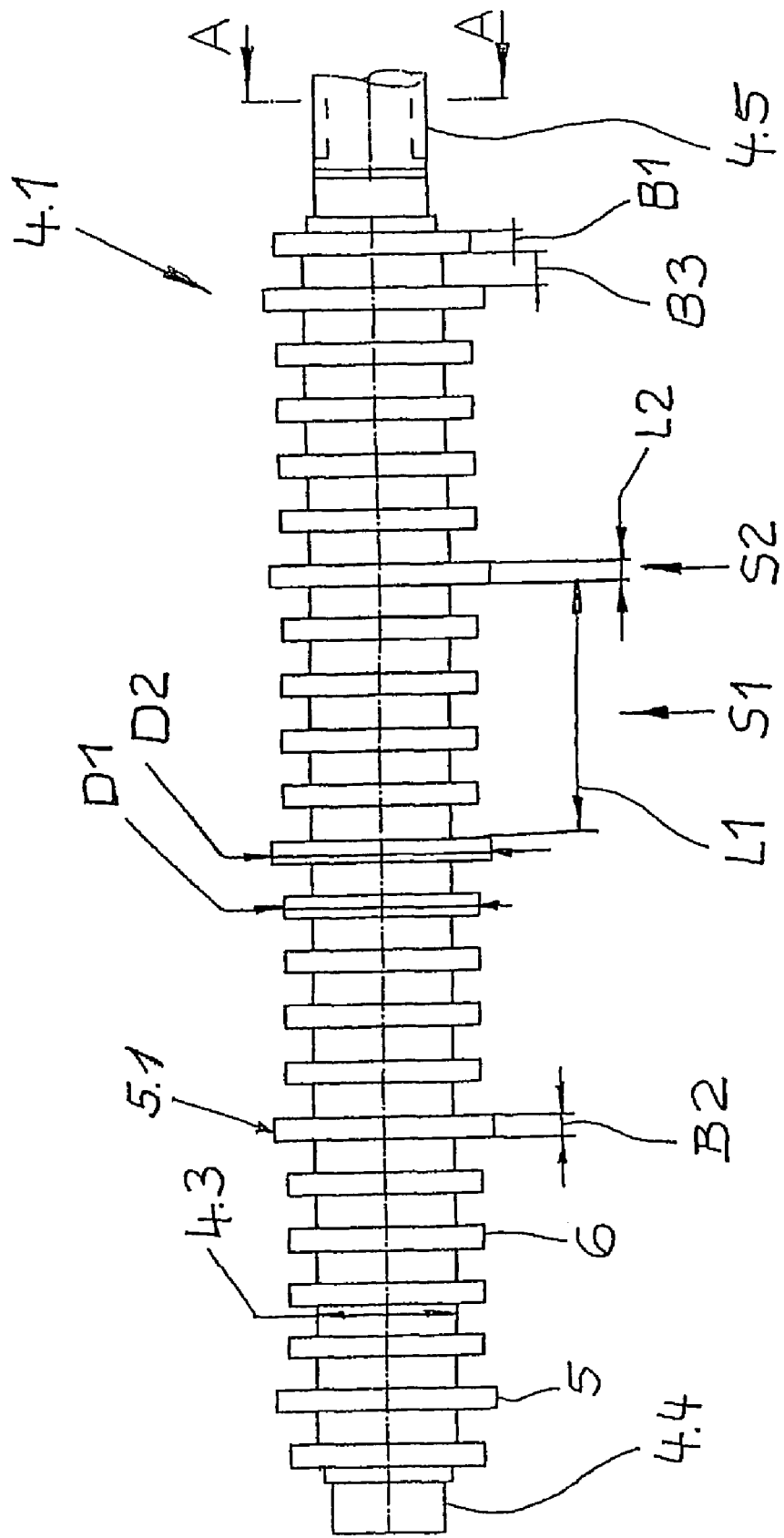

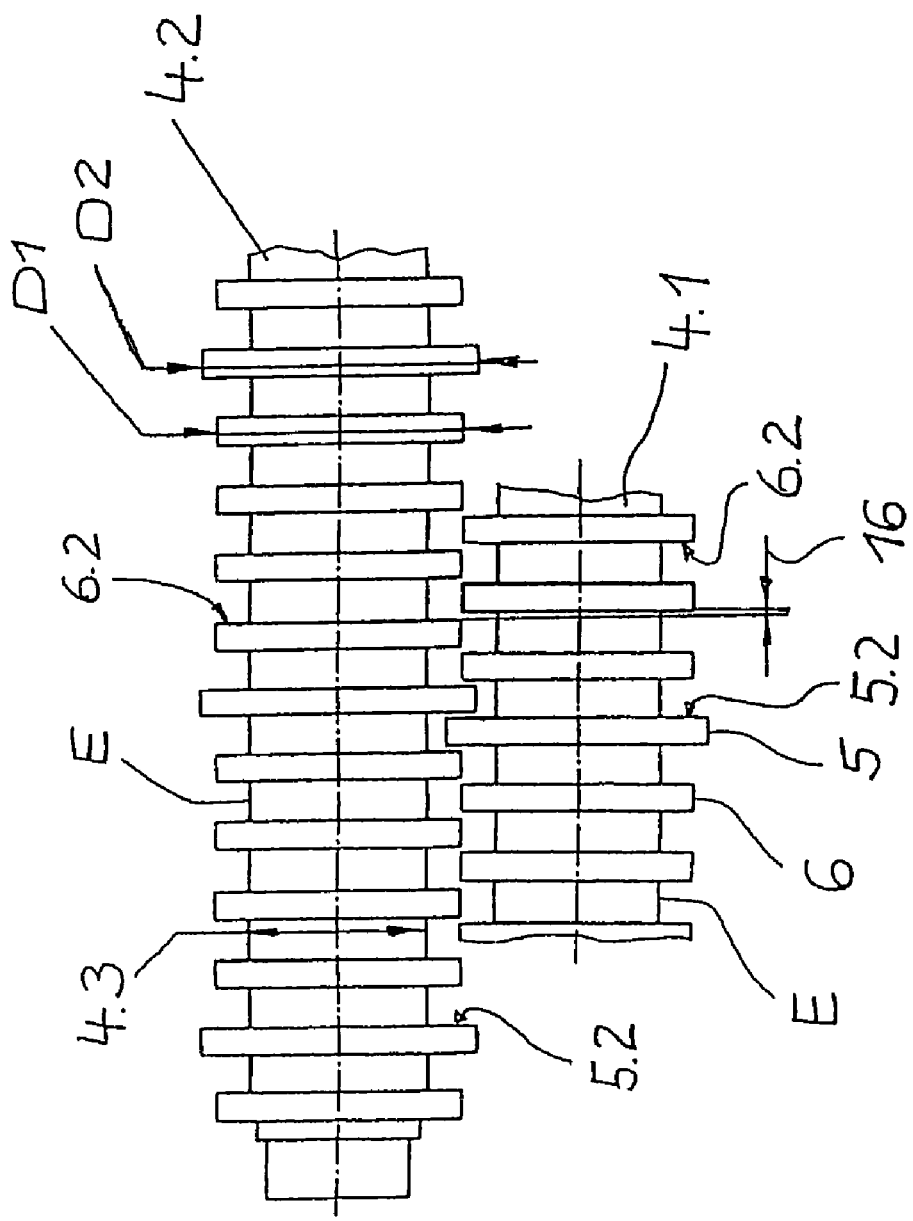
Fig. 3α

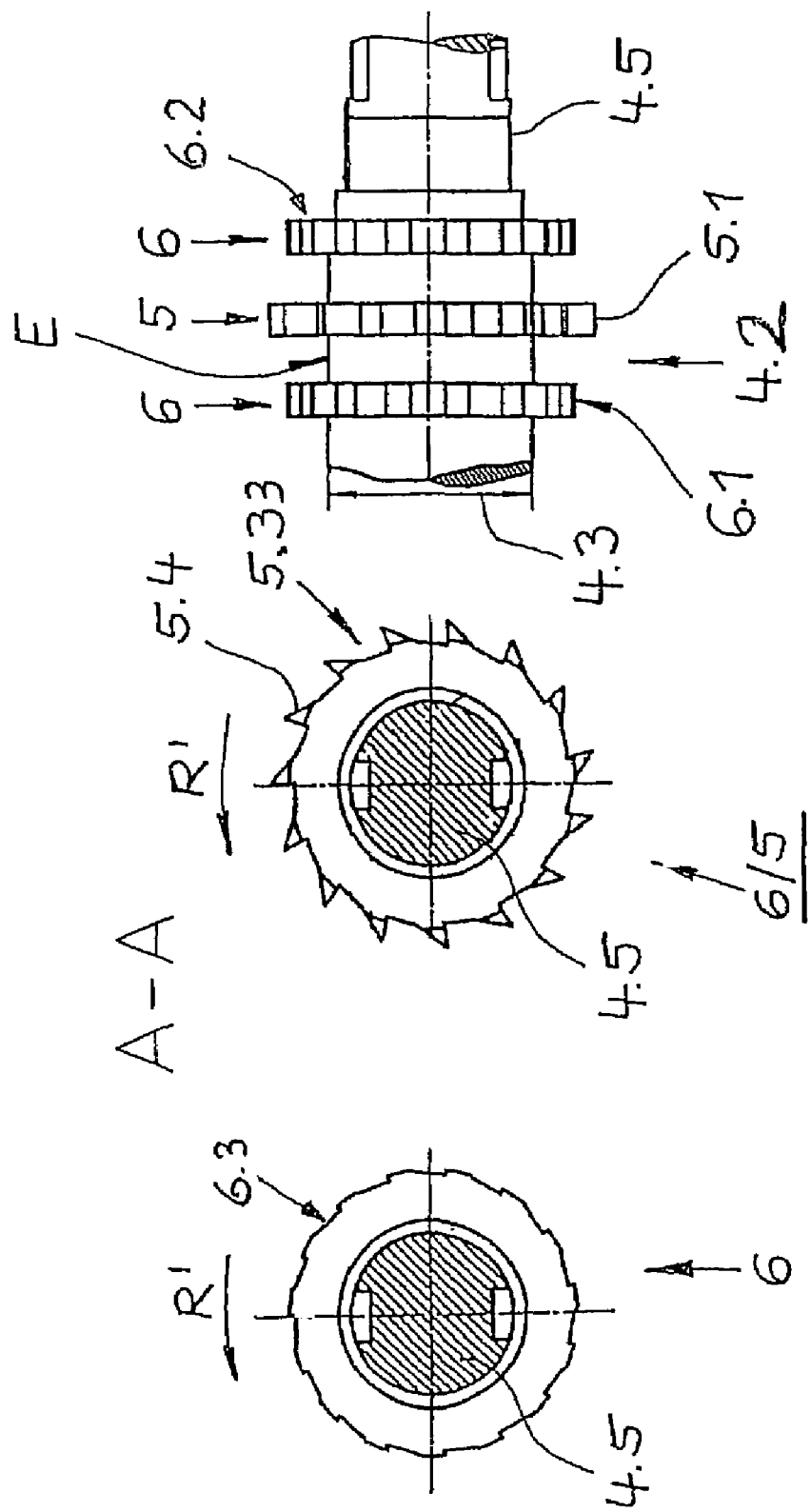

DEVICE FOR PRESSING EMPTY CONTAINERS TOGETHER AND METHOD THEREFOR

CROSS REFERENCE TO RELATED APPLICATIONS

Applicant claims priority under 35 U.S.C. §119 of German Application Nos. 103 20 509.8, 103 25 368.8, 103 53 188.2, filed Apr. 27, 2003, May 26, 2003 and Nov. 13, 2003 respectively. Applicant also claims priority under 35 U.S.C. §365 of PCT/EP2004/004120 filed Apr. 19, 2004. The international application under PCT article 21 (2) was not published in English.

BACKGROUND OF THE INVENTION

The invention relates to a device as well as a method for pressing together empty containers, particularly beverage bottles or cans and similar waste material.

Such devices are used to compact empty containers, particularly those from the foods sector, such as beverage bottles, cans, and similar containers, for transport to recycling facilities or for the recycling process itself.

For one thing, devices that work according to the principle of plate pressing are known, and for another, those whose pressing unit(s) contain rollers are known. These devices are optimized either for the treatment of plastic containers or of tin plate containers or cans.

Since the said waste goods can also contain closed containers, in a not insignificant number, a perforator often precedes the pressing device(s) of these devices, e.g. a perforator according to DE 43 38 561 A1 or U.S. Pat. No. 5,642,661 A.

In order to be able to reduce the technical effort and expense in the case of these devices, devices are also known in which means for perforation are provided on the pressing parts of the pressing device(s), e.g. in the case of a device for compacting empty beverage containers according to DE 100 55 201 A1. This device possesses a conveyor segment that narrows in essentially funnel shape, into which the beverage containers enter and are successively compacted under the effect of devices for transporting them and pressing them together, which delimit the conveyor segment on the sides.

Furthermore, it is provided that there the rollers are equipped with blade-shaped elevations that are distributed on their circumference, which extend over the length of the rollers, in other words parallel to their axis of rotation. Furthermore and in particular in the case of this device, the devices for transporting and pressing together the beverage containers consist of rollers driven by drum motors.

This device is expensive and maintenance-intensive, particularly because of the modules last mentioned.

Another disadvantage results if the distance between the rollers, which are disposed in pairs, particularly those having the least distance between axes, is not precisely adjusted with regard to the distance between them and the position of the blades, which are oriented longitudinally. In this case, cutting of the material that is passed through takes place, so that smaller pieces are formed from a bottle or can, in each instance. Such small and very small pieces are very difficult to process further into bales, if this can even be done at all; additional containers are then required for their transport.

SUMMARY OF THE INVENTION

Proceeding from this state of the art, a person skilled in the art is confronted with the task of configuring a device for pressing together empty containers, particularly beverage bottles or beverage cans made of plastic, particularly PET bottles, or tin plate, in such a manner that pressing them together is reliably guaranteed, and that the production costs and maintenance effort and expense for these devices can be reduced as compared with known devices, and furthermore, an improvement in the method is being sought.

According to the invention, this task is accomplished by means of a device for pressing together empty containers comprising a housing having a fill-in opening and exit opening, a cutting and pressing unit disposed in the housing, the cutting and pressing unit containing at least two rollers that are disposed at a distance from one another with reference to their axes of rotation, and means for driving and controlling the cutting and pressing unit. Each of the rollers, when viewed in a direction along the axis of rotation, has at least two segments, and segments that alternately follow one another along the axis possess different outside diameters from each other. When the rollers are installed, the segments having a larger outside diameter in each roller are offset relative to one another and are disposed with their circumferential surfaces partially overlapping one another, thereby forming cutting disks whose circumferential surfaces each possess at least one groove.

The core idea of the invention consists in the fact that with the new device, the said containers are perforated and pressed together at almost the same time, using only one pair of rollers. The means for perforation are configured in such a manner and disposed on each of the two (pressing) rollers, preferably integrated into the latter, particularly an integral part of their bodies themselves, so that according to the method, wall segments into which cuts have been made hook into the wall segments of a container that is being pressed against them, while the flattened material is being cut in segments and/or immediately afterwards, quasi in the end phase of such a cut. In this way, the container's tendency to expand again after being pressed, which is determined by its original body shape, the elasticity values of the container material, and the pressing process, is counteracted.

Furthermore, on at least one of the rollers of the new device, the means for pressing together are shaped, and disposed in their position relative to the means for pressing together provided on the roller that is positioned essentially parallel opposite, in such a manner that the outer surface of the container, viewed in the crosswise direction to its transport direction, is partially cut or at least partially slit at least in segments. In this way, tensions in the material that are present there are released, and therefore the tendency of the container to expand again after it has been pressed together is also counteracted.

Furthermore, the handling of plastic containers, particularly those of PET material, and of containers made of tin plate, is made possible in the said manner, one immediately after the other, without additional adjustments to the device, by means of the new device.

The new device for pressing together empty containers, particularly beverage bottles or cans made of plastic or tin plate, consists of a housing having a fill-in opening as well as an exit opening (outlet opening) and a cutting and pressing unit disposed in the housing. Furthermore, means for driving and controlling the cutting and pressing unit are provided, whereby the cutting and pressing unit contains at least two rollers that are disposed at a distance from one another with reference to their axes of rotation. Each of the two rollers has several disks disposed at an axial distance from one another, the working disks.

Particularly, it is provided, on this cutting and pressing unit, that each roller, viewed in the longitudinal direction of its axis of rotation, has at least two, preferably more segments, whereby at least one segment of these segments, which alternately follow one another, possesses one or more disks that are spaced axially apart, and whereby these consecutive segments possess a different outside diameter, in each instance, and, in the installed state of the two rollers, at least the segments having the larger diameter are offset relative to one another and are disposed with their circumference surfaces partially meshing (overlapping) next to one another, and thereby form cutting disks. Preferably, at least one groove is provided in the circumference surface of at least one of these cutting disks, which passes through both cutting disk flanks.

Preferably, the length of the segments having the greater diameter is less than the length of the segments that possess one or more disks having a smaller diameter. Preferably, the diameter of the larger disks is 79 mm, the diameter of the longer segments—the pressing regions—is 70 mm, and the core diameter of the rollers is 50 mm.

An advantageous embodiment of the invention also consists in the fact that the segments having the smaller outside diameter also possess at least two recesses that are directed radially inward, reaching to the core diameter, in such a manner that at least one pressure disk is formed. Preferably, however, several pressure disks are worked into the segments having the smaller diameter, which disks are spaced apart from one another by the width of the recess.

Preferably, at least one groove is provided in the circumference surface of at least one of these pressure disks, whereby each groove that is provided passes through both flanks of the pressure disk in question.

According to another embodiment, strippers are disposed between the disks, whereby standard strippers of document shredders can be used.

Since it is supposed to be possible to reliably press together both beverage bottles or beverage cans made of plastic, particularly PET bottles, as well as containers made of tin plate, the requirements to be fulfilled are also of many kinds. In the case of the activities for solving the problem—the theoretical considerations and the practical experiments—it turned out that not only the design (shape) and the number of cutting disks are important in themselves, but also, the dimensioning of the so-called cutting play between adjacent cutting disks and the material used for the cutting rollers have a positive or negative effect on the performance parameters of such a device, including its availability and maintenance effort and expense. A positive effect is achieved if this cutting play has a value between 0.2 mm and 2 mm between adjacent disks, and/or the overlap between adjacent and opposite disks is selected to be between 0.5 mm and 2.5 mm, preferably 10% of the width of a disk.

The rollers of the device preferably consist of the material 42CrMoS4. The disks of the rollers are hardened and maximally have a hardness of 55 HRc.

According to a special embodiment of the grooves formed in the circumference surface of the cutting disk(s), the trailing flank, in the direction of rotation, forms an acute-angle hook with the circumference surface, which points in the direction of rotation, whereby the groove flank that starts at the tip has a linear progression as well as a progression that is directed opposite the direction of rotation of the roller, at least in segments, and the subsequent transition region is configured in arc shape towards the groove toe and/or the groove flank that lies in the circumference direction. Preferably, the two groove flanks run parallel to one another or divergent. The tip angle of the hook is preferably selected to be between 45° and 80°.

In another preferred embodiment, the rollers rotate at a speed of 60 rpm. It is furthermore provided that the start pulse for the rollers is issued by way of a photo eye, and that an after-running time is provided.

Furthermore, it is provided, in the case of the new device, that the cutting and pressing unit is preceded by a separator in the region of the fill-in opening, which comprises, in a preferred embodiment, a supply container having a funnel-like shape. Blades rotate around an axis of rotation of the separator, preferably three or four blades, which pass the waste goods to the cutting and pressing unit in the transport direction, in orderly manner and, at the same time, press the waste goods into the intake gap of the cutting and pressing unit, at least until the containers are seized by the cutting disks. Above the cutting mechanism and behind the separator, one of the walls of the funnel is continued, or a plate-like part is disposed, to delimit the supply area and as a guide surface for passing any containers that might have passed through under the blades or been dragged along back to the supply area.

Other advantageous design details of the new device are the bearings for the rollers that are inserted into the bearing plates from the outside. This is advantageous because it cannot be precluded that containers are closed and furthermore still contain liquid, which in turn can ferment, so that a pressure is built up in the bottle and this liquid sprays about, in uncontrolled manner, in the cutting and pressing unit, during the first perforation.

Because of the latter, nozzles are provided in the housing of the device, to apply disinfectant to the rollers and/or the inlet and outlet openings.

The outside dimensions of the device are such that it can be coupled to automated devices for accepting bottles and/or cans for recycling.

BRIEF DESCRIPTION OF THE DRAWINGS

In the following description part, the invention will be explained in greater detail using advantageous exemplary embodiments schematically shown in drawings. These show.

DETAILED DESCRIPTION OF THE EMBODIMENTS

Figure 1:
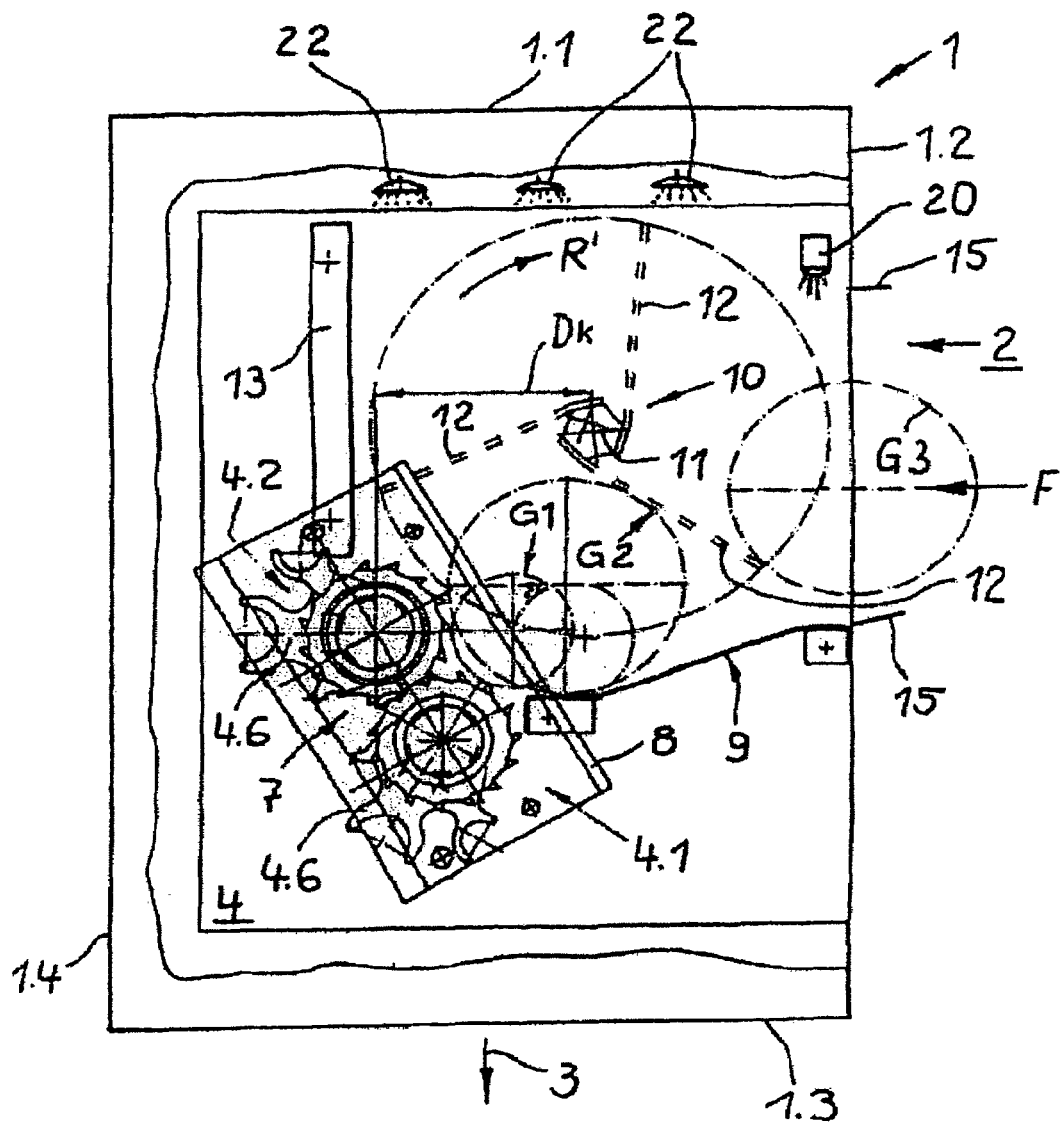
FIG. 1 a device according to the invention in a side view, with the side surface partially opened, and a view of the cutting and pressing unit.

The new device for pressing together empty containers is shown schematically in FIG. 1, in a side view, with a partially opened side surface and a view of the cutting and pressing unit. The device comprises a housing 1, having a fill-in opening 2 in its front side 1.2, as well as an exit opening 3, also called an outlet opening, in its bottom side 1.3, and a cutting and pressing unit 4 disposed in the housing 1, as well as means for driving and controlling the cutting and pressing unit 4, which are not shown here. The top side 1.1 and the rear side 1.4 of the housing 1 are closed in this exemplary embodiment.

The cutting and pressing unit 4 contains two rollers 4.1 and 4.2 that are disposed at a distance from one another with regard to their axes of rotation. Each roller 4.1 and 4.2 has two, preferably several segments S1 and S2—see FIG. 2 to 3a in this regard—viewed in the longitudinal direction of their axes of rotation A1 and A2, respectively, whereby segments that alternately follow one another each possess a different outside diameter D1, D2, in each instance and, in the assembled state of the two rollers 4.1 and 4.2, at least the segments S2 that possess the larger outside diameter D2 are disposed offset relative to one another and partially meshing (overlapping) with their circumference surfaces, next to one another, and thereby form cutting disks 5, the circumference surfaces 5.1 of which possesses at least one groove, in each instance.

A slide 9 is provided in front of the lower edge of the fill-in opening 2, towards the cutting and pressing unit 4, on which the containers G3, G2, or G1 roll or slide to reach the unit 4. Above this slide 9, a separator 10 is positioned, which passes the containers G3, G2, or G1 to the unit 4 in the transport direction F, with its blades 12, here three, that rotate about an axis of rotation 11, in orderly manner and, at the same time, presses them into the intake gap of the cutting and pressing unit 4, at least until the containers are seized by the cutting disks 5. Dk refers to the circumference circle described by the ends of the blades 12. Above the cutting and pressing unit 4 and behind the separator 10, a plate-like frame part 13 is disposed to delimit the accommodation space. The region of the exit of the objects treated in the cutting and pressing unit 4 has the reference symbol 7.

The length L2 of the segments S2 having the larger outside diameter D2 is less than the length L1 of the segments S2 that possess the smaller outside diameter D1.

The segments S1 that possess the smaller diameter D1 possess at least two recesses E that are directed radially inward, up to the core diameter 4.3, in such a manner that at least one pressure disk 6 is formed.

Preferably, several pressure disks 6 are provided in the segments S1 that have the smaller diameter D1, which disks are spaced apart from one another with the width B3 of the recess E, in each instance. The so-called cutting play 16 between adjacent disks 6 or 5 and 6, in other words their side surfaces 6.2 or 5.2, respectively, see FIG. 3a, has a value between 0.2 mm and 2 mm.

B1 refers to the width of the pressure disks 6; B2 refers to the width of the cutting disks 5.

The overlap of adjacent and opposite disks is selected to be in a value range between 0.5 mm and 2.5 mm; preferably, this overlap amounts to 10% of the width of a disk 5 or 6, respectively.

The disks of the rollers 4.1 and 4.2 are hardened and possess a maximal hardness of 55 HRc.

The left end region of the roller 4.1, in this figure, is shaped as a bearing journal 4.4, and the right end region as a bearing and drive journal 4.5.

Figure 2:
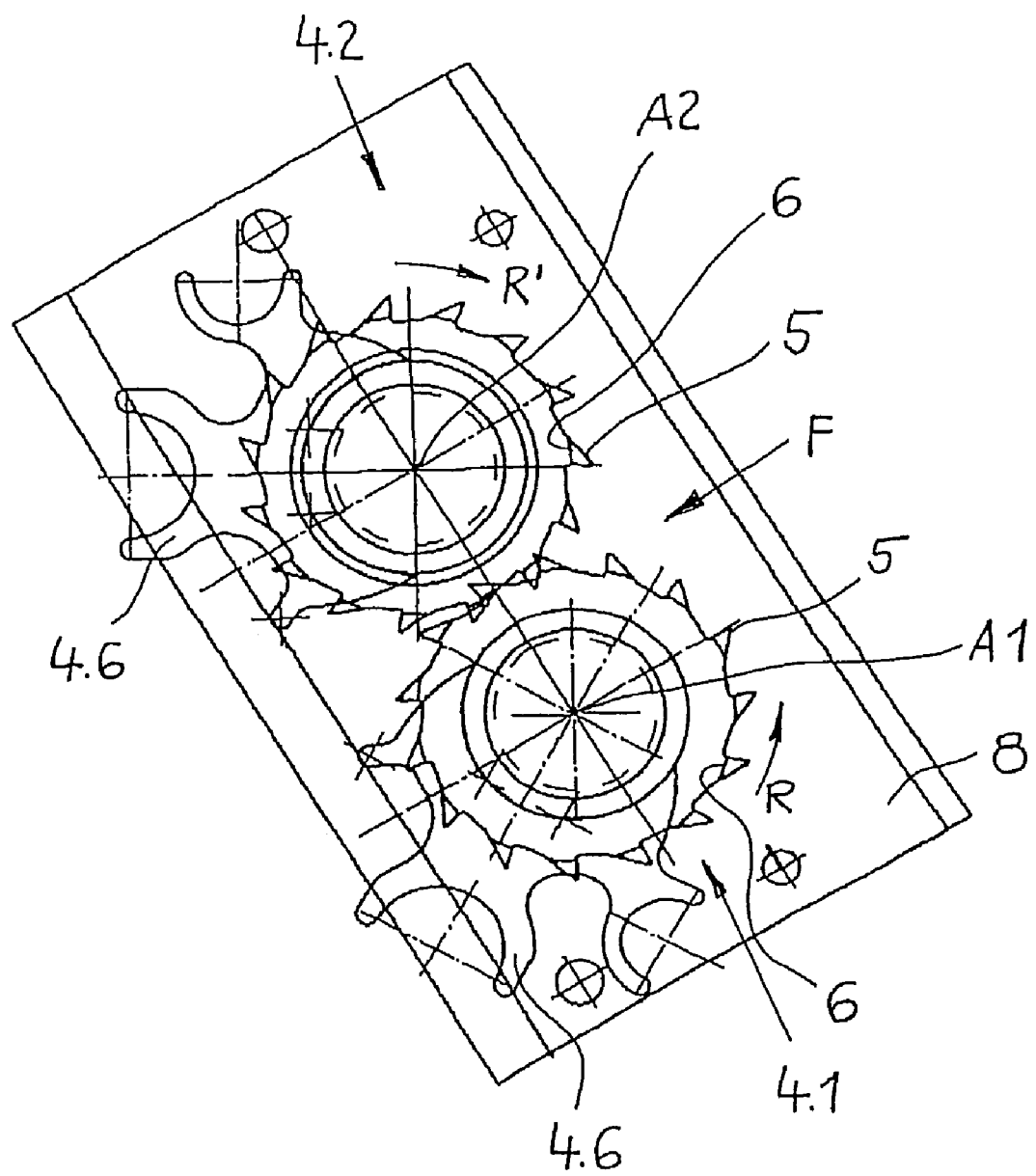
FIG. 2 a schematic view from the side of the two rollers, with the front (left) bearing plate removed, FIG. 3 the first (front) roller in a top view, without drive wheel, FIG. 3a the position of the two rollers relative to one another, FIG. 4a a view of the drive side of one of the rollers, FIG. 4b a face view of FIG. 4a, FIG. 4c a side view of FIG. 4a, without the cutting disk, FIG. 5 a detail of a cutting disk, with another variant of the groove configuration, FIG. 6 another variant of the separator that precedes the rollers, which assumes a press-down function at the same time, and FIGS. 7 and 7a other variants of the blades of the metering and press-down shaft shown in FIG. 1.

In the case of the embodiment shown in FIGS. 1 and 2, the bearings of the rollers 4.1 and 4.2 are inserted into the bearing plates 8 from the outside, and preferably also sealed towards the inside, towards the working space. This design is particularly wear-resistant and maintenance-friendly.

Details of the segments S1 and S2 as well as of the configuration of the rollers are shown in FIG. 3 and 3a. Preferably, the diameter D2 of the segments S2 is 79 mm, the diameter D1 of the smaller segments S1 is 70 mm, and the core diameter 4.3 of the rollers 4.1 and 4.2 is 50 mm.

The speed of rotation of the rollers 4.1 and 4.2 of the cutting and pressing unit 4 is preferably 60 rpm. The start pulse for the rollers 4.1 and 4.2 is preferably issued by way of a photo eye 20; furthermore, an after-running time is also predetermined with this control component, so that all of the containers that have been fed in always leave the cutting and pressing unit. When the rollers are at rest, there are therefore no containers between same; adhesions caused by residual contents of the containers, and unnecessary stress on the cutting regions of the cutting disks are avoided.

FIGS. 1 and 2 also show that in the case of this embodiment, strippers 4.6 are disposed between the disks 5 and 6, whereby standard strippers of document shredders are used.

Nozzles 22 are disposed in the housing 1 to apply disinfectant and/or cleaner to the rollers 4.1 and 4.2 and/or the inlet opening 2 and the outlet opening 3, so that any odor formation promoted by liquid residues and the ambient atmosphere (bacteria formation) can be prevented.

Figure 5:
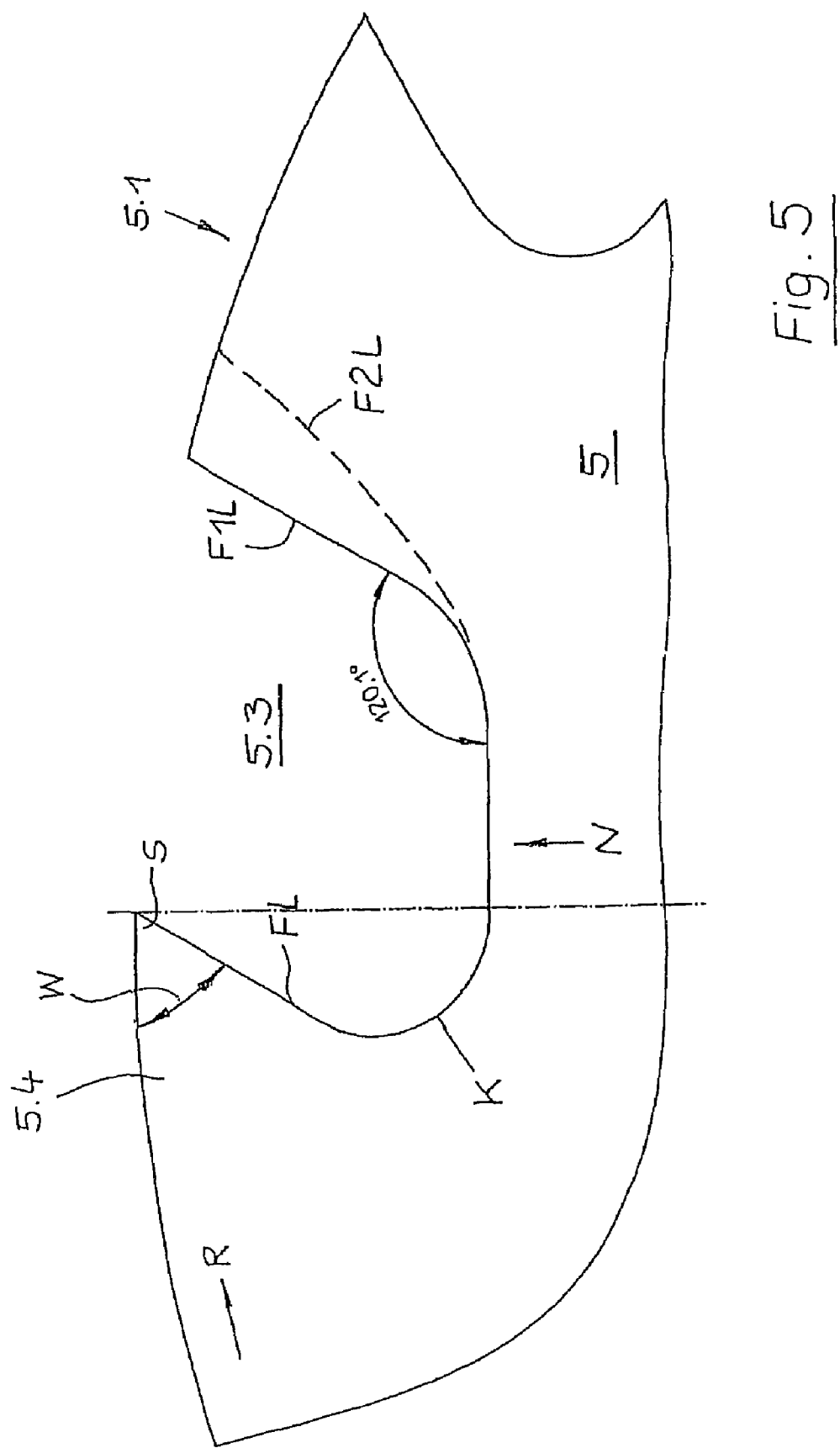

FIGS. 4a to 5 show exemplary embodiments for the detailed configuration of the cutting disks 5 and the pressure disks 6, as well as the grooves disposed in the cutting disks 5.

According to FIG. 5, the trailing flank FL of the grooves 5.3 disposed in the circumference surface 5.1 of the cutting disks 5, in the direction of rotation R, R', forms an acute-angle hook 5.4 with the circumference surface 5.1, which points in the direction of rotation, whereby the groove flank FL that starts at the tip S has a linear progression as well as a progression that is directed opposite the direction of rotation of the rollers R, R', and the subsequent transition region K is configured in arc shape towards the groove toe N and/or the groove flank F1L or F2L that lies in the direction of rotation.

Preferably, the two groove flanks FL and F1L run parallel to one another or divergent FL, F2L. The tip angle W of the hook 5.4 is preferably selected to be between 45° and 80°.

FIG. 4a shows the right segment of the second roller 4.2, the rear roller shown in FIG. 3a. The bearing and drive journal provided in this end region is designated as item 4.5. A cutting disk 5 is flanked by a pressure disk 6 on both sides. Grooves 6.3 and 5.33, respectively, are disposed in the circumference surface 6.1 and 5.1, respectively, which break up their side surfaces 6.2 and 5.2, respectively.

A face view of FIG. 4a is shown in FIG. 4b, with a view of the side surface 6.2 and the hooks 5.4 of the cutting disk 5 disposed behind it. FIG. 4c shows a face view of FIG. 4a, in which the cutting disk 5 was left out in the representation of the component being considered, in order to be able to show the formation of the grooves 6.3 in the pressure disk 6 more clearly. As shown schematically, the depth of the grooves 6.3 is significantly less, as compared with the depth of the grooves 5.3.

Figure 6:
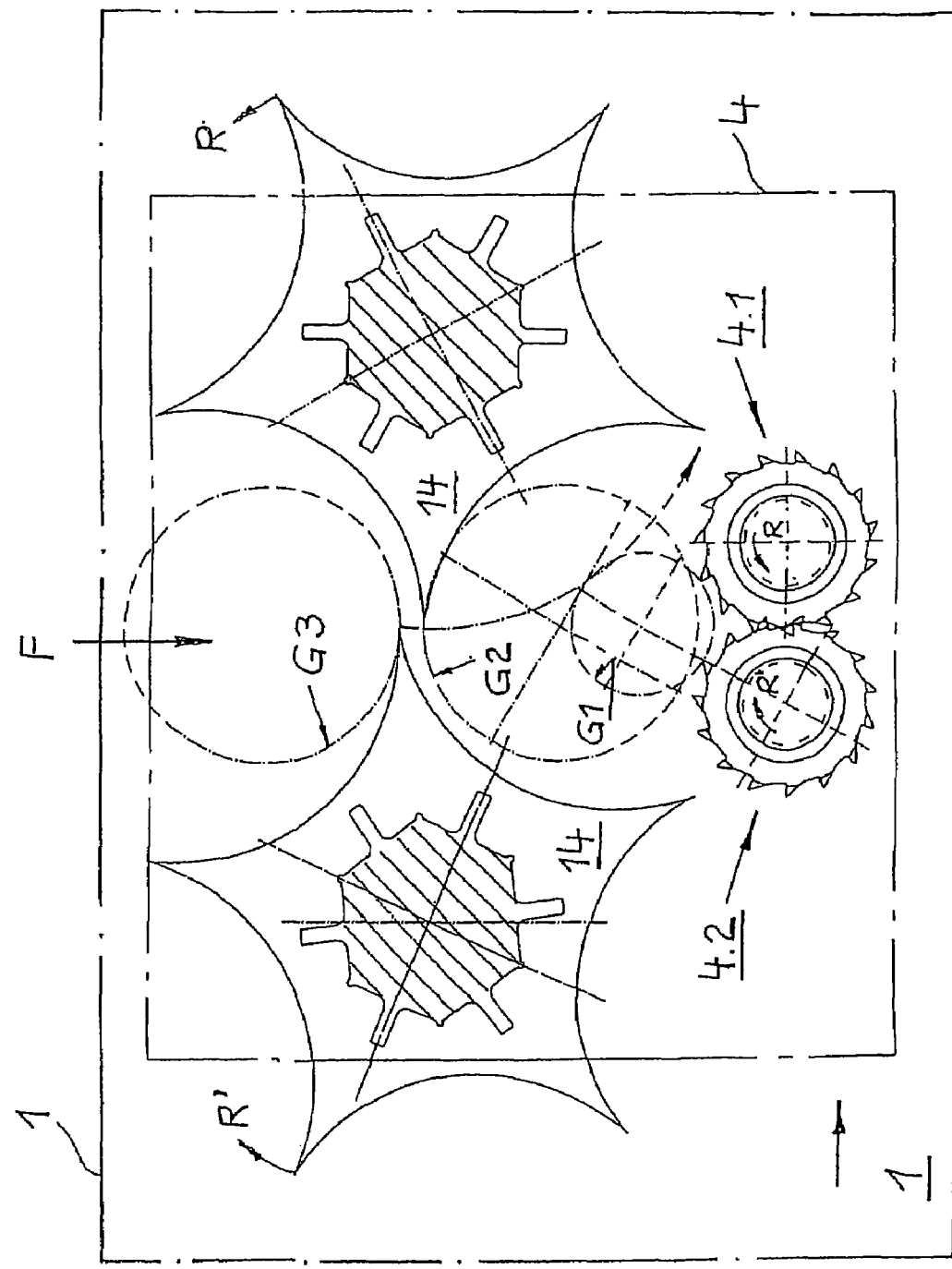

FIG. 6 shows another variant of a separator. This separator 14 possesses two star-shaped shafts, viewed in the side (face) view, the direction of rotation of which is the same as that of the related rollers.

Figure 7:
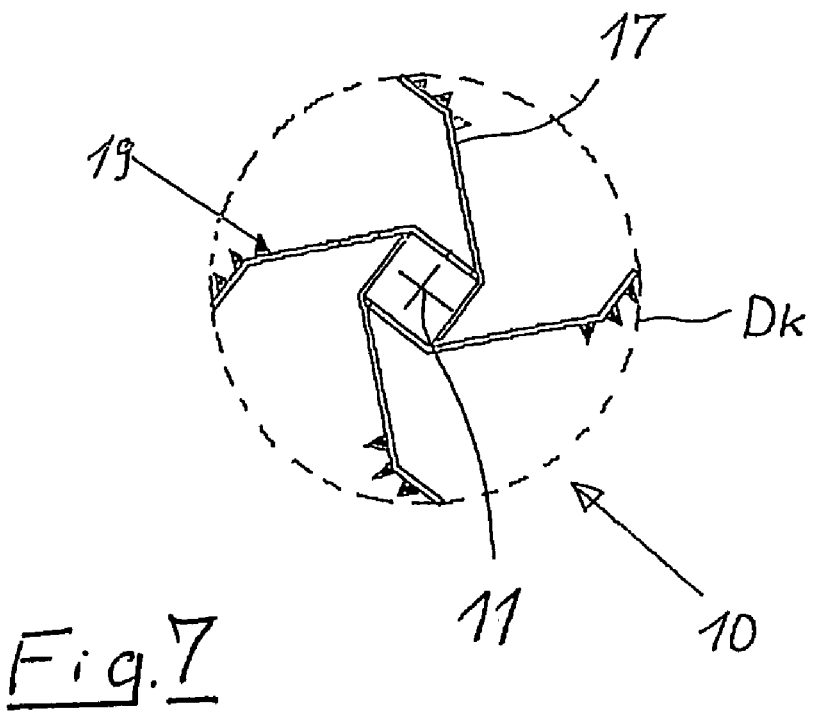
Figure 7A:
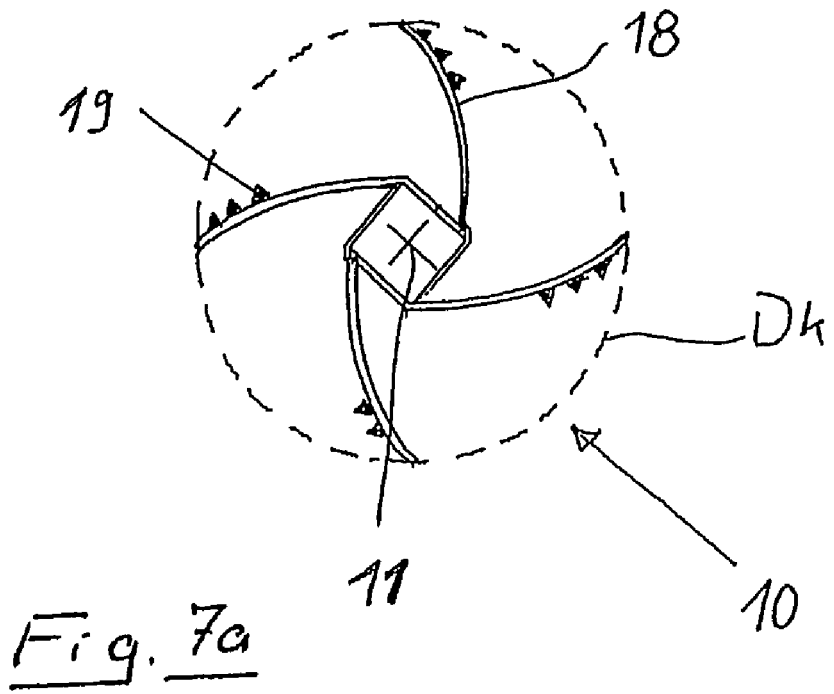

FIGS. 7 and 7*a* show other variants of the blades of the separator 10. Proceeding from the center, the axis of rotation 11, these blades are shaped in a polygon progression 17 or in arc shape 18. These embodiments guarantee, even better than the basic variant, that the containers being passed in, particularly containers having a volume between 0.25 liters and 3 liters, receive an optimal contact pressure in the direction of the intake gap of the cutting and pressing unit 4. As is furthermore evident from these two figures, the end regions of the blades 17 and 18, respectively, are fitted with stabbing elements 19. The tip of these stabbing elements 19 points in the direction of rotation, in other words in the working direction. By means of this measure, holding and guiding the containers to the intake gap of the cutting and pressing unit 4 is improved even more. Particularly in the case of containers that have very thin walls or are very flexible, it can happen, under some circumstances, that the blade ends could slip past such a container. These stabbing elements 19 counteract such a tendency.

Figure 1A:
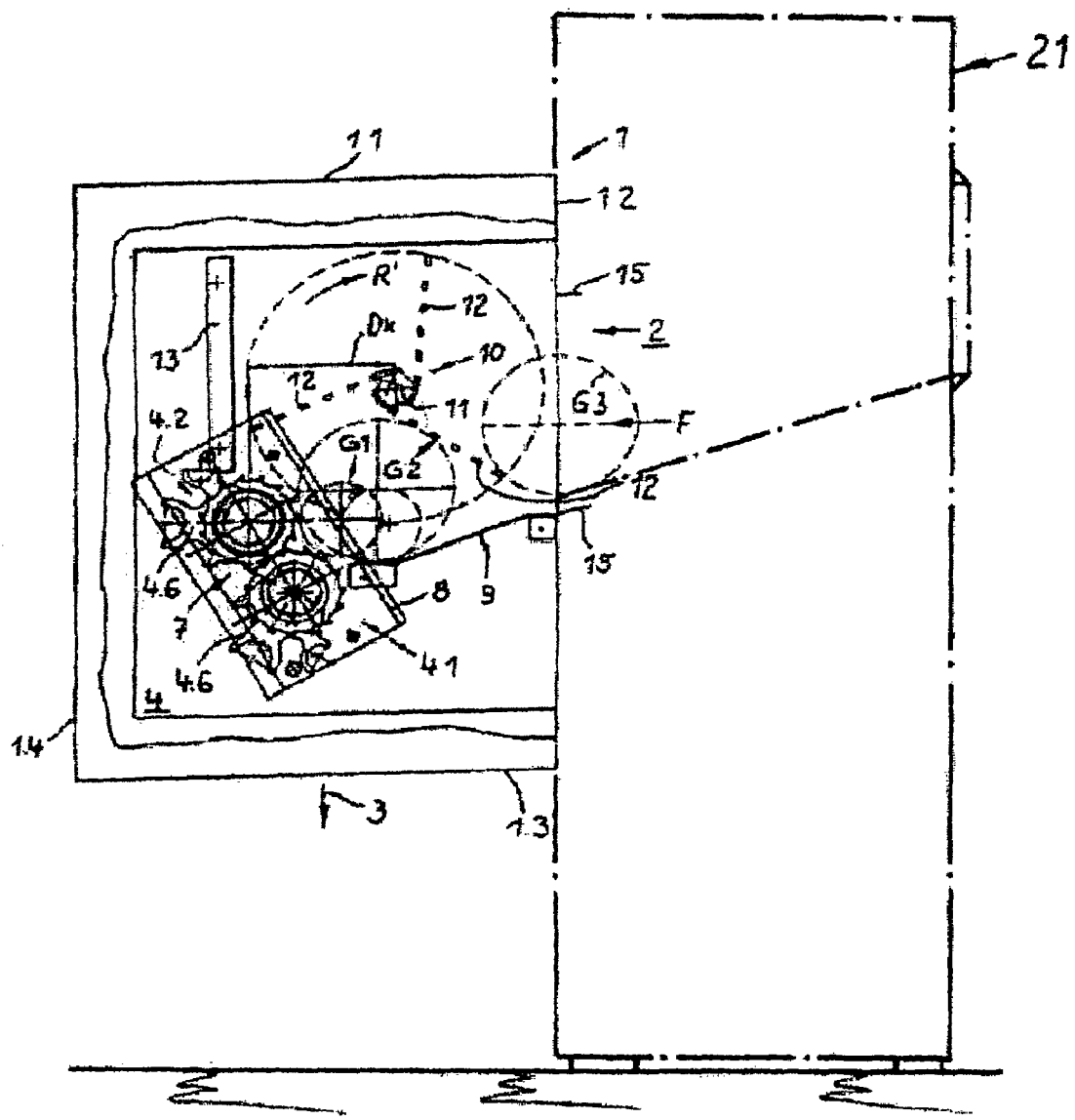
FIG. 1a shows the device according to the invention connected with an automated device for accepting bottles and/or cans for recycling.

In the case of the embodiment according to FIG. 1, connector fittings 15 are provided on the front side 1.2, in the region of the fill-in opening. These are affixed there in case the device is supposed to be coupled with an automated device 21 for accepting bottles and/or cans for recycling, such as shown in FIG. 1*a*.

All of the characteristics mentioned in the above description, as well as those that can be derived solely from the drawings, are further integral parts of the invention, even if they are not particularly emphasized and, in particular, are not mentioned in the claims.

The invention is not restricted to the exemplary embodiment described, but rather is variable in many different ways, within the scope of the disclosure.

Reference Symbol List

| | |
|---|---|
| 1 | housing |
| 1.1 | top side (surface) |
| 1.2 | front side |
| 1.3 | bottom side |
| 1.4 | rear side |
| 2 | fill-in opening |
| 3 | outlet opening (exit opening) |
| 4 | cutting and pressing unit |
| 4.1 | first roller (front) |
| 4.2 | second roller (rear) |
| 4.3 | core diameter |
| 4.4 | bearing journal |
| 4.5 | bearing and drive journal |
| 4.6 | stripper |
| 5 | cutting disks |
| 5.1 | circumference surfaces |
| 5.2 | side surfaces |
| 5.3, 5.33 | grooves |
| 5.4 | hook |
| 6 | pressure disks |
| 6.1 | circumference surface |
| 6.2 | side surface |
| 7 | exit |
| 8 | bearing plates |
| 9 | slide |
| 10 | separator |
| 11 | axis of rotation of item 10 |
| 12 | blade(s) |
| 13 | frame part (delimitation of the accommodation space towards the rear) |
| 14 | separator (selector) |
| 15 | connector fitting(s) |
| 16 | cutting play |
| 17 | blade, polygon progression |
| 18 | blade, arc-shaped |
| 19 | stabbing elements (sharp screws, nails, or a similar part) |
| A1 | axis of rotation of the roller 4.1 |
| A2 | axis of rotation of the roller 4.2 |
| B1 | width of item 6 |
| B2 | width of item 5 |
| B3 | width of the recesses |
| D1 | diameter of the segments S1 (outside diameter) |
| D2 | diameter of the segments S2 (outside diameter) |
| Dk | circumference circle of the blades according to FIG. 1 |
| E | recesses |
| F | transport direction |
| FL | flank |
| F1L | flank |
| F2L | flank |
| N | groove toe |
| K | transition region |
| W | tip angle |
| G1, G2, G3 | containers having different diameters |
| S | tip of item 5.4 |
| S1 | segments |
| S2 | segments |
| L1 | length of the segments S1 |
| L2 | length of the segments S2 |
| R | direction of rotation (turning direction) |
| R' | direction of rotation (turning direction) |

The invention claimed is:

1. A device for pressing together empty plastic containers, comprising:
   a housing having a fill-in opening and exit opening;
   a cutting and pressing unit disposed in the housing, said cutting and pressing unit containing at least two rollers that are disposed at a distance from one another with reference to their axes of rotation and a plurality of strippers; and
   means for driving and controlling the cutting and pressing unit,
   wherein each of the rollers, when viewed in a direction along the axis of rotation, has two types of segments, and wherein the segments that alternately follow one another along said axis possess different outside diameters from each other, and wherein when the rollers are installed, said segments having a larger outside diameter in each roller are formed by cutting disks, the cutting disks are offset relative to one another and are disposed with their circumferential surfaces partially overlapping one another, each of the circumferential surfaces possess at least one groove,
   wherein each of the segments having a smaller outside diameter is formed by a plurality of pressure disks, said segment having the smaller outside diameter possess several recesses that are directed radially inward, reaching to a core diameter of the roller, to form the pressure disks which are each spaced apart from one another by an amount of a width of the recess,
   so that containers being passed to said segments are perforated in partial regions by the segments having the larger diameter and at the same time, regions adjacent the perforated partial regions are pressed together by the segments having the smaller diameter which are disposed axially next to the segment having the larger diameter so that the containers leave the exit opening of the device compacted into a panel shape, and wherein the strippers are disposed between the cutting and pressure disks.

2. The device according to claim 1, wherein a length of the segments having the larger outside diameter is less than a length of the segments that possess a smaller outside diameter.

3. The device according to claim 1, wherein a cutting play between the disks that are adjacent to one another has a value of between 0.2 mm and 2 mm.

4. The device according to claim 1, wherein the overlap of the adjacent and opposite cutting disks has a value range between 0.5 mm and 2.5 mm.

5. The device according to claim 1, wherein the rollers consist of 42CrMoS4.

6. The device according to claim 1, wherein the disks are hardened and possess a maximal hardness of 55 HRc.

7. The device according to claim 1, wherein the rollers having bearings that are inserted into bearing plates.

8. The device according to claim 1, wherein the diameter of the segments having the larger diameter is 79 mm, and the diameter of the segments having the smaller diameter is 70 mm, and the core diameter of the rollers is 50 mm.

9. The device according to claim 1, wherein a speed of rotation of the rollers is 60 rpm.

10. The device according to claim 1, further comprising a photo eye that issues a start pulse for the rollers, said photo eye also controlling a subsequent run time for the rollers, to ensure that all of the containers fed to the cutting and pressing unit leave the cutting and pressing unit before the rollers stop.

11. The device according to claim 1, further comprising nozzles in the housing to apply disinfectant to the rollers or to inlet and outlet openings.

12. The device according to claim 1, wherein the cutting disks have grooves worked into their circumferential surface, each groove having a leading flank and a trailing flank, said trailing flank, in a direction of rotation, forms an acute-angle hook with the circumferential surface, said hook pointing in the direction of rotation, wherein the trailing flank, starting at a tip, has a linear progression as well as a progression that is directed opposite the direction of rotation of the rollers, and a subsequent transition region that is configured in an arc shape towards a groove toe or the leading flank in the direction of rotation.

13. The device according to claim 12, wherein the two groove flanks run parallel to one another or are divergent.

14. The device according to claim 12, wherein a tip angle of the hook is selected to be between 45° and 80°.

15. The device according to claim 1, wherein the cutting and pressing unit is preceded by a separator/selector.

16. The device according to claim 15, wherein the separator/selector is a blade shaft that has three or four blades whose free blade ends trail, viewed in a direction of rotation.

17. The device according to claim 16, wherein the blades attached in the center, at the axis of rotation, are configured to have a polygon progression or arc shape towards their free ends.

18. The device according to claim 15, wherein the separator/selector, viewed in a side view, consists of two star-shaped shafts.

19. The device according to claim 15, further comprising stabbing elements disposed on surface segments of the separator that contact containers being fed in, which elements point in a direction of rotation.

20. The device according to claim 1, wherein the device can be coupled to automated devices for accepting bottles and/or cans for recycling, or can be combined with such devices.

21. A method for pressing together empty containers, said method using a device comprising:

a housing having a fill-in opening and exit opening;

a cutting and pressing unit disposed in the housing, said cutting and pressing unit containing at least two rollers that are disposed at a distance from one another with reference to their axes of rotation and a plurality of strippers; and means for driving and controlling the cutting and pressing unit, wherein each of the rollers, when viewed in a direction along the axis of rotation, has at least two segments, and wherein the segments that alternately follow one another along said axis possess different outside diameters from each other, and wherein when the rollers are installed, said segments having a larger outside diameter in each roller are formed by cutting disks, the cutting disks are offset relative to one another and are disposed with their circumferential surfaces partially overlapping one another, each of the circumferential surfaces possess at least one groove, each of the segments having a smaller outside diameter is formed by a plurality of pressure disks, the segment having the smaller outside diameter have several recesses to form the pressure disks, the pressure disks are spaced apart from one another by an amount of a width of the recess, and the strippers are disposed between the cutting and pressure disks, the method comprising the following steps:

pressing wall segments of a container against one another with the cutting and pressing unit;

cutting the pressed wall segments with the cutting and pressing unit; and hooking the wall segments into one another during cutting of the wall segments in the cutting and pressing unit, wherein the containers are perforated in partial regions by the segments having the larger diameter and at the same time, regions adjacent the perforated partial regions are pressed together by the segments having the smaller diameter which are disposed axially next to the segment having the larger diameter so that the containers leave the exit opening of the device compacted into a panel shape.

22. The method according to claim 21, wherein hooking takes place in an end phase of the cutting step.

23. A method according to claim 21, wherein hooking takes place immediately during cutting.

* * * * *